United States Patent Office 3,205,277
Patented Sept. 7, 1965

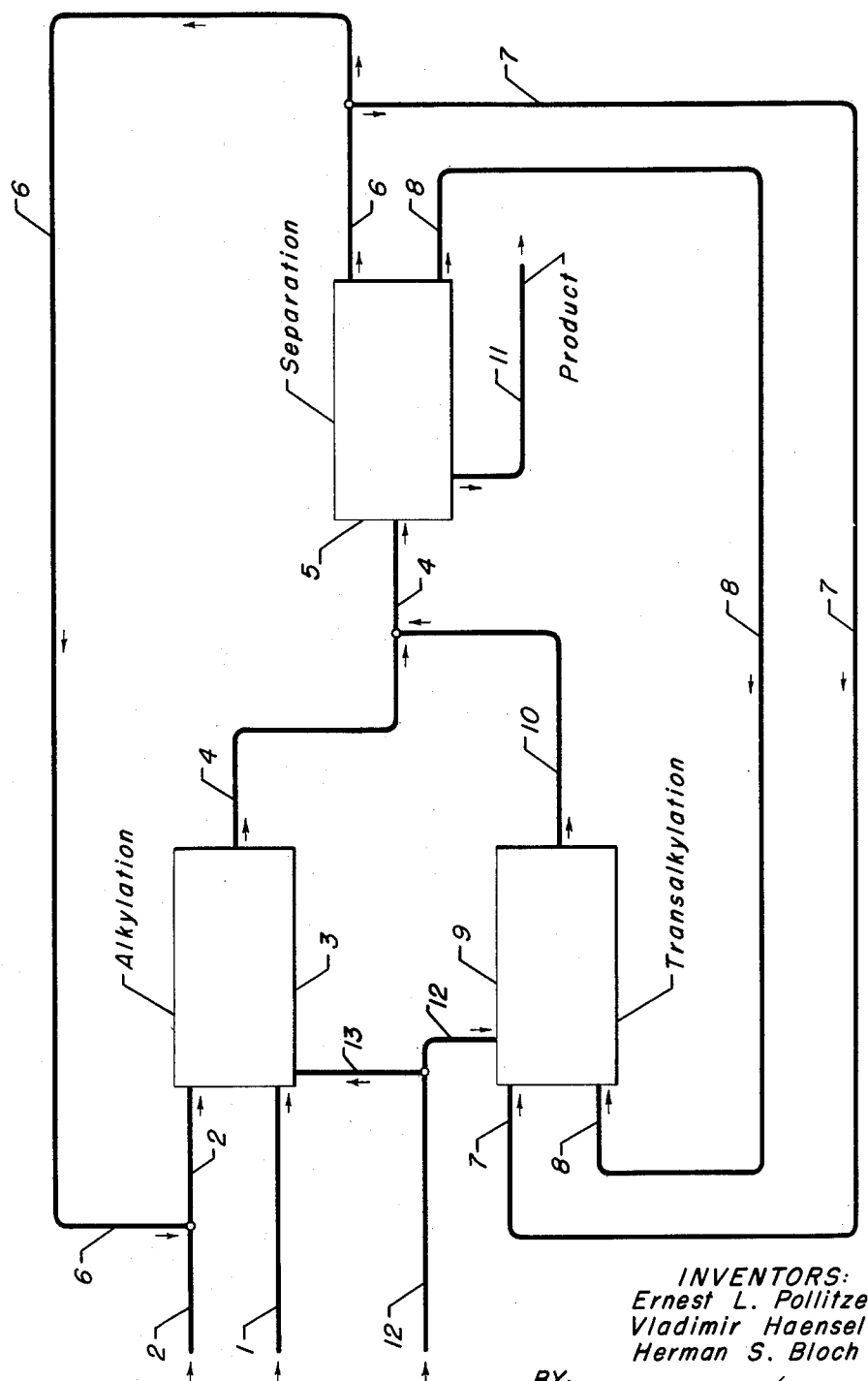

3,205,277
ALKYLATION-TRANSALKYLATION PROCESS
Ernest L. Pollitzer and Vladimir Haensel, Hinsdale, and Herman S. Bloch, Skokie, Ill., assignors to Universal Oil Products Company, Des Plaines, Ill., a corporation of Delaware
Filed Dec. 21, 1962, Ser. No. 246,459
12 Claims. (Cl. 260—671)

This invention relates to a process for the production of an alkylaromatic compound and more particularly relates to a process for the alkylation of an alkylatable aromatic compound with an olefin-acting compound, and still more particularly relates to the alkylation of an aromatic hydrocarbon with an olefinic hydrocarbon which may be in combination with other gases which are unreactive at the process conditions utilized. Further, this invention relates to a combination process including the steps of alkylation, transalkylation and separation.

An object of this invention is to produce alkylated aromatic hydrocarbons, and more particularly, to produce monoalkylated benzene hydrocarbons. A specific object of this invention is a process for the production of ethylbenzene, a desired chemical intermediate, which ethylbenzene is utilized in large quantities in dehydrogenation processes for the manufacture of styrene, one of the starting materials for the production of resins and some synthetic rubber. Another specific object of this invention is to produce alkylated aromatic hydrocarbons boiling within the gasoline boiling range having high anti-knock value and which may be used as such or as a component of gasoline suitable for use in automobile and airplane engines. A further specific object of this invention is a process for the production of cumene by the reaction of benzene with propylene, which cumene product is oxidized in large quantities to form cumene hydroperoxide which is readily decomposed into phenol and acetone. Another object of this invention is to provide a process for the introduction of alkyl groups into aromatic hydrocarbons of high vapor pressure at normal conditions with minimum loss of said high vapor pressure aromatic hydrocarbons and maximum utilization thereof in the process. Still another object of this invention is a process in which molar excesses of aromatic hydrocarbons to be alkylated are utilized, and in which process the yield of monoalkylated aromatic hydrocarbon product is exceptionally high due to maximum consumtion of polyalkylated aromatic hydrocarbon by-products in the process. The further object of utilization of a high activity catalyst of long useful life prepared by specific methods of treatment, along with other objects of this invention, will be set forth hereinafter as part of the accompanying specification.

One embodiment of the present invention relates to a process for the production of an alkylaromatic compound which comprises alkylating an alkylatable aromatic compound with an olefin-acting compound in an alkylation reaction zone containing a conversion catalyst consisting essentially of a fluorine-containing refractory inorganic oxide composite characterized as having a Hammett acidity function value of less than − 8.0, said composite having been previously treated with a substantially anhydrous oxygen-free inert gas at a temperature of between 450° C. and about 700° C., commingling the effluent of said alkylation zone with effluent from a transalkylation reaction zone as hereinafter set forth, passing the thus commingled effluents to a separation zone, separating from the separation zone unreacted aromatic compound, desired monoalkylated aromatic compound and higher molecular weight polyalkylated aromatic compound, recycling at least a portion of said unreacted aromatic compound to the alkylation reaction zone, removing desired monoalkylated aromatic compound as product from the process, passing said polyalkylated aromatic compound and at least a portion of said unreacted aromatic compound to a transalkylation reaction zone containing said conversion catalyst, therein reacting the polyalkylated aromatic compound with unreacted aromatic compound, and recycling the effluent therefrom to said commingling step as aforesaid.

A further embodiment of this invention resides in a process for the production of ethylbenzene which comprises alkylating benzene with ethylene in an alkylation reaction zone containing a conversion catalyst consisting essentially of a fluorine-containing alumina composite characterized as having a Hammett acidity function value of less than −8.0, said composite having been previously treated with substantially anhydrous nitrogen at a temperature of between 450° C. and about 700° C., commingling the effluent of said alkylation zone with effluent from a transalkylation zone as hereinafter set forth, passing the thus commingled effluents to a separation zone, separating from the separation zone unreacted benzene, desired ethylbenzene and higher molecular weight polyethylbenzenes, recycling at least a portion of said unreacted benzene to the alkylation reaction zone, removing desired ethylbenzene as product of the process, passing said polyethylbenzenes and at least a portion of said unreacted benzene to a transalkylation reaction zone containing said conversion catalyst, therein reacting the polyethylbenzenes with unreacted benzene, and recycling the effluent therefrom to said commingling step as aforesaid.

A specific embodiment of the present invention relates to a process for the production of ethylbenzene which comprises alkylating benzene with a refinery off-gas containing a minor quantity of ethylene in an alkylation reaction zone at alkylation conditions including a temperature in the range of from about 210° C. to about 325° C., a benzene to ethylene mol ratio in the range of from about 4:1 to about 20:1, a pressure of from about atmospheric to about 200 atmospheres, and a liquid hourly space velocity of from about 0.1 to about 10, said alkylation reaction zone containing a conversion catalyst consisting essentially of a fluorine-containing gamma-alumina composite characterized as having a Hammet acidity function value of less than −8.0, said composite having been previously treated with substantially anhydrous hydrogen at a temperature of between 450° C. and about 700° C., commingling the effluent of said alkylation zone with effluent from a transalkylation reaction zone as hereinafter set forth, passing the thus commingled effluents to a separation zone, separating from the separation zone unreacted benzene, desired ethylbenzene, and higher molecular weight polyethylbenzenes, recycling at least a portion of said unreacted benzene to the alkylation reaction zone, removing desired ethylbenzene as product from the process, passing said polyethylbenzenes and at least a portion of said unreacted benzene to a transalkylation reaction zone containing said conversion catalyst at transalkylation conditons including a temperature of from about 220° C. to about 350° C., a benzene to polyethylbenzene mol ratio of greater than 1, a pressure of from about atmospheric to about 200 atmospheres and a liquid hourly space velocity of from about 0.1 to about 10, therein reacting the polyethylbenzenes with unreacted benzene, and recycling the effluent therefrom to said commingling step as aforesaid.

Other embodiments of the present invention will become apparent in considering the specification as hereinafter set forth.

This invention can be most clearly described and illustrated with reference to the attached drawing. While of necessity, certain limitations must be present in such a schematic description, no intention is meant thereby to limit the generally broad scope of this invention. As stated hereinabove, the first step of the process of the present invention comprises alkylating an alkylatable aromatic compound with an olefin-acting compound in an alkylation reaction zone containing a conversion catalyst consisting essentially of a fluorine-containing refractory inorganic oxide composite characterized as having a Hammett acidity function value of less than −8.0 that has been previously treated wth a substantially anhydrous oxygen-free inert gas at a temperature of between 450° C. and about 700° C. In the drawing, this first step is represented as taking place in alkylation reaction zone 3 labeled alkylation. However, the mixture of alkylatable aromatic compound and olefin-acting compound must be furnished to this reaction zone. In the drawing, the olefin-acting compound is represented as being furnished to reaction zone 3 through line 1. The alkylatable aromatic compound is represented as being furnished to reaction zone 3 through line 2.

The olefin-acting compound, particularly olefin hydrocarbon, which may be charged to reaction zone 3 via line 1, may be selected from diverse materials including monoolefins, diolefins, polyolefins, acetylenic hydrocarbons, and also alcohols, ethers, and esters, the latter including alkyl halides, alkyl sulfates, alkyl phosphates, and various esters of carboxylic acids. The preferred olefin-acting compounds are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes and mixtures thereof, and still higher molecular weight liquid olefins, the latter including various olefin polymers having from about 9 to about 18 carbons atoms per molecule including propylene trimer, propylene tetramer, propylene pentamer, etc. Cycloolefins such as cyclopentene, methylcyclopentene, cyclohexene, methylcyclohexene, etc., may also be utilized. Also included within the scope of the olefin-acting compound are certain substances capable of producing olefinic hydrocarbons or intermediates thereof under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, etc., ethyl bromide, n-propyl bromide, isopropyl bromide, n-butyl bromide, iso-butyl bromide, etc. Preferred alkyl halides that may be utilized in the process of the present invention are the alkyl chlorides and alkyl bromides, a representative number of which are hereinabove set forth. As stated hereinabove, other esters such as alkyl sulfates including ethyl sulfate, propyl sulfate, etc., and alkyl phosphates including ethyl phosphate, etc., may be utilized although not necessarily with equivalent results. Ethers such as diethyl ether, ethylpropyl ether, dipropyl ether, etc., are also included within the generally broad scope of the term olefin-acting compound and may be successfully utilized, although not necessarily with equivalent results, as alkylating agents in the process of this invention.

Olefin hydrocarbons, particularly normally-gaseous hydrocarbons, are olefin-acting compounds for use in the process of this invention and for passage by means of line 1 to reaction zone 3. The process of this invention may be successfully applied to and utilized for complete conversion of olefin hydrocarbons when these olefin hydrocarbons are present in minor quantities in various gas streams. Thus, the normally gaseous olefin for use in the process of this invention need not be concentrated. Such normally gaseous olefin hydrocarbons appear in minor quantities in various refinery gas streams, usually diluted with gases such as hydrogen, nitrogen, methane, ethane, propane, etc. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc. Such refinery gas streams have in the past often been burned for fuel value, since an economical process for the utilization of their olefin hydrocarbon content has not been available, or processes which have been suggested by the prior art utilized such large quantities of alkylatable aromatic compound that they have not been economically feasible. This is particularly true for refinery gas streams known as off-gas streams containing relatively minor quantities of olefin hydrocarbons such as ethylene. Thus, it has been possible to catalytically polymerize propylene and/or butene in the various refinery gas streams, but the off-gases from such processes still contain the utilizable olefin hydrocarbon, ethylene.

In addition to containing ethylene in minor quantities, these off-gas streams contain other olefin hydrocarbons, depending upon their source, including propylene and butenes. A refinery off-gas ethylene stream may contain varying quantities of hydrogen, nitrogen, methane and ethane with the ethylene in minor proportion, while a refinery off-gas propylene stream is normally diluted with propane and contains the propylene in minor quantity, and a refinery off-gas butene stream is normally diluted with butanes and contains the butenes in minor quantities. A typical analysis in mol percent for utilizable refinery off-gas from a catalytic cracking unit is as follows: nitrogen, 4.0%; carbon monoxide, 0.2%; hydrogen, 5.4%; methane, 37.8%; ethylene, 10.3%; ethane, 24.7%; propylene, 6.4%; propane, 10.7% and $C_4$ hydrocarbons, 0.5%. It is readily observed that the total olefin content of this gas stream is 16.7 mol percent and the ethylene content is even lower, namely 10.3%. Such gas streams containing olefin hydrocarbons in minor or dilute quantities are particularly preferred alkylating agents within the broad scope of this invention.

The olefin-acting compound, acting as the alkylating agent, combines therewith in alkylation zone 3 alkylatable aromatic compound from line 2 as will be set forth hereinafter. Many aromatic compounds are utilizable as alkylatable aromatic compounds within the process of this invention. The preferred aromatic compounds are aromatic hydrocarbons, and the preferred aromatic hydrocarbons are monocyclic aromatic hydrocarbons, that is, benzene hydrocarbons. Suitable aromatic hydrocarbons include benzene, toluene, and other alkyl benzenes or mixtures thereof. Higher molecular weight alkyl-aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. or mixtures thereof. Very often alkylate is obtained as a high boiling fraction with the alkyl group attached to the aromatic nucleus varying in size from about $C_9$ to $C_{18}$. Other suitable aromatic hydrocarbons, which at specified reaction conditions, depending upon the melting point of the aromatic chosen, would be in liquid form, would include those aromatic hydrocarbons with two or more aryl groups such as diphenyl, diphenyl methane and other polycyclic aromatics. Examples of other aromatic hydrocarbons within the scope of this invention which at specified reaction conditions depending upon the melting point of the aromatic chosen would be in liquid form, include those containing condensed aromatic rings. These include naphthalene, alkyl naphthalenes, anthracene, phenanthrene, naphthacene, rubrene, etc. Of the alkylatable aromatic hydrocarbons for use as starting materials in the process of this invention, the benzene hydrocarbons are preferred, and of the benzene hydrocarbons, benzene itself is particularly preferred.

Prior to passage to the alkylation zone, unreacted aromatic compound is combined with the fresh feed alkylatable aromatic compound via lines 6 and 2 as hereinafter set forth. Recycled unreacted aromatic compound is available in the process since it is preferred to utilize a molar excess of alkylatable aromatic compound over olefin-acting compound, preferably olefin. This, as disclosed in the prior art, has been found necessary to prevent side reactions from taking place such as for example, polymerization of the olefin-acting compound prior to reaction thereof with the alkylatable aromatic compound and to direct the reaction principally to monoalkylation. Best results are obtained when the alkylatable aromatic compound to olefin-acting compound molar ratio is from about 4:1 to about 20:1 or more. It is one of the features of this invention that unreacted aromatic compound is available for recycle to the alkylation reaction zone.

Alkylation zone 3 is of the conventional type with a conversion catalyst disposed therein in the reaction zone consisting essentially of a fluorine-containing refractory inorganic oxide composite characterized as having a Hammett acidity function value of less than —8.0 that is treated by specific methods of preparation. The alkylation zone may be equipped with heat transfer means, baffles, trays, heating means, etc. The alkylation reaction zone is preferably of the adiabatic type and thus feed to the alkylation zone will preferably be provided with the requisite amount of heat prior to passage thereof to said alkylation zone.

In accordance with the present process, a fluorine-containing refractory inorganic oxide composite characterized as having a Hammett acidity function value of less than —8.0 is utilized. The fluorine-containing refractory inorganic oxide composite characterized as having a Hammett acidity function value of less than —8.0 is prepared by methods such as, for example, impregnation with ammonium fluoride; by incorporating the fluoride directly in the dropping sol or precipitation solution as HF; or by impregnation with hydro-fluorides or organic bases such as methylammonium fluoride, dimethylammonium fluoride, ethanolamine hydrofluoride, pyridine hydrofluoride, aniline hydrofluoride, trimethylbenzylamine fluoride, etc., followed by appropriate calcination as hereinafter described.

As set forth hereinabove, suitable fluorine-containing refractory inorganic oxide composites are those characterized as having a Hammet acidity function value of less than —8.0. The acid strength of a solid surface is defined as its proton-donating ability, quantitatively expressed by Hammett and Deyrup's $H_0$ function, where $$H_0 = -\log a_{H+} f_B / f_{BH+}$$

and where $a_{H+}$ is the hydrogen ion activity of the surface acid and $f_B$ and $f_{BH+}$ are activity coefficients of the basic and acid forms, respectively, of the adsorbed indicator. To apply the function $H_0$ as an acid strength index for solid surfaces, it is necessary that the ratio $f_B/f_{BH+}$ for an adsorbed indicator be independent of the indicator used. Hammett indicators utilizable are listed in Table I, together with their color changes and $pK_a$'s. To give some idea of the enormous acid strength range spanned by this bank of indicators, sulfuric acid compositions corresponding to the mid-point of each of the acid-base transitions are also listed. The limits of the $H_0$ of a surface are established by observing the color of the adsorbed form of the Hammett indicators. As examples, solid having an $H_0$ of —5.6 to —8.2 gives a yellow color with benzalacetophenone and gives no color with anthraquinone; a solid with an $H_0$ less than —8.2 gives acid colors with all Hammett indicators.

Crystal violet is not included with the indicators which Hammett used because its color change is so complex. The basic form of this indicator is violet and the form corresponding to the addition of a single proton is green. However, in more strongly acidic solutions, the indicator undergoes a further color change to yellow. The complexity of these color changes makes it impossible to assign a definite value of $pK_a$ to this indicator. However, it has been found that crystal violet is less basic than the least basic of the Hammett indicators, so that the $pK_a$ of the indicator appears to be less than —8.2. It is to be recalled that the more negative values of $H_0$ represent more acidic surfaces.

TABLE I

*Indicators used for acid strength determination* [1]

| Indicator | Color Change | | $pK_a$ | $H_2SO_4$ percent Wt. |
|---|---|---|---|---|
| | Basic color | Acid color | | |
| Neutral red (2-methyl-3-amino-6-dimethyl-aminophenazine). | Yellow | Red | +6.8 | $8 \times 10^{-8}$ |
| Phenylazonaphthylamine | do | do | +4.0 | $5 \times 10^{-5}$ |
| Butter yellow (N,N-dimethyl-p-phenyl-azoaniline). | do | do | +3.3 | $3 \times 10^{-4}$ |
| Benzeneazodiphenylamine | do | Purple | +1.5 | 0.02 |
| Dicinnamalacetone (1,9-diphenyl-1,3,6,8-nonatetraen-5-one). | do | Red | —3.0 | 48 |
| Benzalacetophenone | Colorless | Yellow | —5.6 | 71 |
| Anthraquinone | do | do | —8.2 | 90 |
| Crystal Violet | Violet-Green | Yellow | $<-8.2$ | $>90$ |

[1] Much of this table and the preceding discussion of the $H_0$ function is based on J. Am. Chem. Soc. 78, 5490-5494 (1956).

Suitable refractory inorganic oxide composites characterized as having a Hammett acidity function value of less than —8.0 after incorporation of fluorides as taught herein include silica (a non-metallic refractory oxide), and various refractory metal oxides such as alumina, silica-alumina, silica-alumina-magnesia, silica-magnesia, silica-zirconia, alumina-zirconia, alumina-boria, zirconium dioxide, titanium dioxide, etc. The fluorine-containing refractory inorganic oxide may be further characterized as having a high surface area. By the term high surface area is meant a surface area measured by surface adsorption techniques within the range of from about 25 to about 500 or more square meters per gram and preferably a refractory inorganic oxide having a surface area of approximately 100 to 300 square meters per gram. Particularly preferred supports for the preparation of catalysts utilizable in the process of the present invention include high surface area crystalline alumina modifications such as gamma-, eta- and theta-alumina, although these are not necessarily of equivalent suitability.

The fluorine-containing refractory inorganic oxide to be utilized in the process of the present invention may be manufactured in accordance with any of the well-known suitable methods of manufacture, none of which is considered uniquely essential to the present invention. Alumina may be prepared, for example, by adding a suitable alkaline reagent such as ammonium hydroxide to a soluble salt of aluminum, such as the chloride, the sulfate, the nitrate, etc., in an amount to form aluminum hydroxide which, upon drying and calcining, is converted to alumina. Other refractory inorganic oxides, particularly silica, may be added to the alumina in any suitable manner including separate, successive or coprecipitation means. Although alumina is manufactured in a variety of shapes, such as pills, granules, cakes, spheres, extrudates, etc. a preferred form of alumina is the sphere. When in the form of spheres, the alumina may be continuously manufactured by the oil-drop method which consists of passing droplets of a suitable aluminum-containing hydrosol into an oil bath maintained at an elevated temperature and retaining the droplets within said oil bath until they are set to firm hydrogel spheroids. The spheroids are continuously withdrawn from the oil bath and immediately thereafter subjected to particular aging treatments for the purpose of imparting thereto the desired physical characteristics. It is not essential to the method of the present invention that the refractory inorganic oxide be prepared in any particular manner, nor that the refractory inorganic oxide exist in any special physical shape; the methods of preparation, and the various forms of alumina hereinabove set forth, are intended to be illustrative rather than restrictive upon the present invention.

As set forth hereinabove, the catalyst consists essentially of a fluorine-containing refractory inorganic oxide composite characterized as having a Hammett acidity function value of less than −8.0 that is treated by specific methods of preparation. The amount of fluorine that may be contained by the composite will range from about 2% or lower to about 12% or higher based upon the weight of the refractory inorganic oxide although concentrations corresponding from about 6.0 to about 10.0% fluorine by weight are especially preferred to be composited with the refractory inorganic oxide initially.

The essential feature of the preparation of the conversion catalyst utilized in the present process is the utilization of a substantially anhydrous oxygen-free inert gas as the treating agent. The fluorine-containing refractory inorganic oxide composite having a Hammett acidity function value of less than −8.0 is treated at a temperature in the range of from about 450° C. to about 700° C. or higher in the presence of the substantially anhydrous oxygen-free inert gas thereby yielding a final active, stable catalytic composition of matter. A preferred final catalytic composition of matter contains from about 2.0 to about 8.0% by weight of fluoride. This preconditioning step in the presence of an oxygen-free inert gas has been found necessary in order to prevent instantaneous deactivation of the catalytic sites of the catalyst. The exact nature of the phenomenon effected through the action of the substantially anhydrous oxygen-free inert gas resulting in the beneficial change in the characteristics of the fluorine-containing inorganic oxide, is not known precisely. It is postulated that after calcination or other exposure to air there is a layer of oxygen strongly adsorbed on the catalyst surface, namely the fluorine-containing refractory inorganic oxide, and that to displace it for activation of the hereinbefore mentioned catalytic sites the utilization of a substantially anhydrous oxygen-free inert gas is necessary. In this manner, the oxygen on the catalyst surface is removed so that the reaction of the bound oxygen with hydrocarbons is avoided and instantaneous deactivation by condensation of carbonaceous materials is therefore avoided. Typical substantially anhydrous oxygen-free inert gases include nitrogen, hydrogen, helium, neon, argon, krypton and xenon. Especially preferred substantially anhydrous oxygen-free inert gases include nitrogen and hydrogen. These gases do not have an adverse effect upon the resultant catalyst activity but only a beneficial effect. Furthermore, as will be demonstrated in the examples, this treating step results in catalytic compositions of matter of unexpectedely high activity for certain hydrocarbon conversion reactions. In contradistinction to the prior art, it has also been found that a treated chlorine-containing refractory inorganic oxide catalytic composition of matter is from about ½ to about ⅓ as active and substantially less stable than the treated fluorine-containing refractory inorganic oxide composite thereby showing the non-equivalency of treated fluorine- and treated chlorine-containing refractory inorganic oxide composites which are prepared according to the process of the present invention.

The length of the treating step with the substantially anhydrous oxygen-free inert gas, as well as the total quantity of substantially anhydrous oxygen-free inert gas which is passed through the fluorine-containing inorganic oxide in contacting the same, is dependent upon the quantity of the material to be so treated, the means employed to disperse the substantially anhydrous oxygen-free inert gas throughout the refractory material, and other similar variables. The substantially anhydrous oxygen free inert gas will contain water in an amount less than about 0.5 mol percent and preferably less than about 0.1 mol percent in order to effect the successful preparation of the conversion catalyst utilized in the process of the present invention.

High temperature calcination in an atmosphere of air at a temperature in excess of about 400° C. prior to treating the fluorine-containing refractory inorganic oxide composite in the presence of a substantially anhydrous oxygen-free inert gas may also be ulitized, if necessary, to economically dry the fluorine-containing refractory inorganic oxide composite. In this manner, the substantially anhydrous oxygen-free inert gas is not used wastefully as a drying agent, although it readily could be used as such, and it is conserved for the activation of the catalyst. Further, when organic bases such as those hereinbefore mentioned are used as the fluorinating agent, the calcination step may be utilized to remove the organic material and may be followed by the treating step with the oxygen-free inert gas. The treating step is essential as hereinbefore set forth to activate the catalytic sites of the refractory inorganic oxide and to prevent instantaneous deactivation of the desired final catalytic composition of matter.

As hereinbefore stated, the particular means by which the fluorine-containing refractory inorganic oxide is prepared is not limiting upon the method of the present invention. The refractory inorganic oxide spheres may be placed in a suitable vessel in which they are disposed while the various procedures described are being effected. The treating step may be carried out by causing the substantially anhydrous oxygen-free inert gas to pass through the vessel either upflow, downflow, or crossflow. In some instances, the fluorine-containing refractory inorganic oxide spheres may be placed on a moving belt, and the gaseous material caused to pass over, under and through the spheres while the latter are disposed on the belt. It is preferred, however, to have the fluorine-containing refractory inorganic oxide spheres, or other shaped particles, disposed within an enclosed vessel such as alkylation zone 3 or transalkylation zone 9 wherein the gaseous material may be passed through the particles via lines 12 and 13 to alkylation zone 3 and/or via line 12 to transalkylation zone 9 thereby preconditioning the catalyst in situ prior to the production of alkylaromatic compound.

Although the catalyst exhibits a high degree of stability, that is, the capability of performing its intended function over an extended period of time, without the necessity for instituting frequent regenerations thereof, the catalyst is regenerable thereby furthr satisfying the objective of increased economy of operation. Lines 12 and 13 may also be utilized to furnish oxygen to the catalyst zones for use in the regeneration of the conversion catalyst, if desired, after processing has been completed.

The conditions utilized in reaction zone 3 may be varied over a relatively wide range. Thus, the desired alkylation reaction in the presence of the above-indicated conversion catalyst may be effected at a temperature of from about 210° C. or lower to about 325° C. or higher although a temperature in the range of 230° C. to about 320° C. is preferred. The alkylation reaction is usually carried out at a pressure of from about substantially atmospheric, preferably from about 15 atmospheres to about 200 atmospheres or more. The pressure utilized is usually selected to maintain the alkylatable aromatic compound in substantially liquid phase. However, within the above-mentioned temperature and pressure ranges, it is not always possible to maintain the olefin-acting compound completely in liquid phase. Thus, when utilizing a refinery off-gas containing ethylene as the olefin-acting compound, the ethylene will be dissolved in the liquid phase alkylatable aromatic compound (and alkylaromatic compound as formed) to the extent governed by temperature, pressure, and solubility considerations. However, a portion thereof will always be in the gas phase. The hourly liquid space velocity of the liquid through the alkylation zone may be varied over a relatively wide range of from about 0.1 to about 10 or more.

When the alkylation reaction has proceeded to the desired extent, preferably with substantially 100% conversion of the olefin-acting compound, the products from the alkylation zone which may be termed alkylation zone effluent pass from alkylation reaction zone 3 via line 4 to a commingling step, hereinafter described, to separation zone 5.

In separation zone 5, unreacted aromatic compound, desired monoalkylated aromatic compound and higher molecular weight polyalkylated aromatic compound are separated by means such as, for example, fractional distillation. A portion of the unreacted aromatic compound is recycled via lines 6 and 2 to alkylation zone 3 to prevent side reactions from taking place and to direct the reaction principally to monoalkylation. Best results are obtained when the alkylatable aromatic compound to olefin-acting compound molar ratio is from about 4:1 to about 20:1 or more. The balance or net amount of the unreacted aromatic compound passes via lines 6 and 7 to transalkylation reaction zone 9, hereinafter described. Polyalkylated aromatic compound is passed to the transalkylation zone via line 8 from separation zone 5. Line 8 may be equipped with means not shown such as venting means and/or drag-stream means, if desired, to discard unconvertible high-boiling condensation products that may form and accumulate during the processing operation. Desired alkylated aromatic compound is removed as product from the process via line 11 from separation zone 5.

Transalkylation zone 9 is of the conventional type with a conversion catalyst consisting essentially of a fluorine-containing refractory inorganic oxide composite characterized as having a Hammett acidity function value of less than −8.0 that is treated by specific methods of preparation, as set forth hereinabove, disposed therein in the reaction zone. The transalkylation zone may be equipped with heat transfer means, baffles, trays, heating means, etc. The reactor is preferably of the adiabatic type and thus the feed to the reactor will preferably be provided with the requisite amount of heat prior to passage thereof to said reactor. As set forth hereinabove, the transalkylation reaction zone is packed with a conversion catalyst as described hereinbefore. The particular conversion catalyst is generally selected so that the same material is utilized in both the alkylation reaction zone and the transalkylation reaction zone. Since the conditions necessary for transalkylation are generally more severe than for the alkylation, one effective means for increasing severity is by utilization of a bed of conversion catalyst in transalkylation zone 9 of greater depth than was utilized in the alkylation zone 3. By the utilization of such greater bed depth, one effectively decreases the liquid hourly space velocity of the combined feed therethrough and thus increases reaction zone severity. As was the case with the conditions utilized in the alkylation reaction zone, the conditions utilized in transalkylation reaction zone 9 may be varied over a relatively wide range, but, as set forth hereinabove, are usually of greater severity than prevail in the alkylation reaction zone. Various means other than increasing catalyst bed depth and decreasing hourly space velocity may be utilized for increasing this reaction zone severity. For example, when the alkylation reaction zone and transalkylation reaction zone are separate as shown in the drawing, one may effectively increase the temperature by proper placement of heating means before each reactor. The transalkylation reaction may be effected at temperatures of from about 220° C. to about 350° C. or higher, although preferred temperatures are in the range of from about 235° C. to about 320° C. The transalkylation reaction is usually carried out at a pressure of from about substantially atmospheric, preferably from about 15 atmospheres to about 200 atmospheres or more. Here again, the pressure utilized is selected to maintain the alkylatable aromatic compound and polyalkylated aromatic compound in substantially liquid phase. Referring to the alkylatable aromatic compound, it is preferable to have present in the transalkylation reaction zone from about 1 to about 10 or more, sometimes up to 20, molar proportion per molar proportion of alkyl group in the polyalkylated aromatic hydrocarbon introduced therewith. The hourly liquid space velocity of the liquid through transalkylation zone 9 may be varied over a relatively wide range of from about 0.1 to about 10 or more. The alkylatable aromatic compound to polyalkylated aromatic compound ratio in the transalkylation reaction zone can be varied independently of the alkylation reactor rate. When the transalkylation reaction has proceeded to the desired extent so that a sufficient quantity of polyalkylated aromatic compounds are converted to monoalkylated aromatic compounds by reaction with alkylatable aromatic compound, the products from transalkylation zone 9 are withdrawn through line 10 and commingled with the alkylation zone effluent from alkylation zone 3 via line 4 and passed to separation zone 5 for recovery of the desired components therefrom. By the utilization of the commingling step, the unreacted aromatic compound, monoalkylated aromatic compound and polyalkylated aromatic compound are fed directly to the separation zone for separation into the desired components as hereinabove described.

The following examples are introduced to further illustrate the utility of the present invention, and to indicate the benefits afforded through the use thereof. They are not intended to limit the invention to the specific material, conditions and/or concentrations involved therein. The catalytically active carrier material employed in the examples was prepared by the oil-drop method hereinbefore described. The examples were carried out in a bench scale pilot plant equipped with two separate reactors, gas-liquid separation means, fractionation means for separation and recycle of excess alkylatable aromatic compound, fractionation means for separation and recovery of monoalkylated aromatic compound, and recycle means for polyalkylated aromatic compound. The reactors were equipped with separate heating means so that the temperatures in each could be maintained at different levels. The alkylation reaction zone was of sufficient size so that a bed of approximately 75 cc. of conversion catalyst can be utilized therein. The transalkylation reaction zone was of sufficient size so that a bed of approximately 100 cc. of conversion catalyst could be utilized therein.

EXAMPLE I

A fluorine-containing refractory inorganic oxide composite was prepared by impregnating high surface area alumina spheres with ammonium fluoride. The resultant fluorine-containing high surface area (190 square meters per gram) alumina was tested for acid strengtht using the crystal violet Hammett indicator. The Hammett indicator changed from violet to yellow indicating a Hammett acidity function value of less than −8.2. The resultant fluorine-containing refractory inorganic oxide characterized as having a Hammett acidity function value of less than −8.0 was then placed in the alkylation reaction zone and in the transalkylation reaction zone and subjected to high temperature calcination in an atmosphere of air at a temperature in excess of 400° C. prior to treating. The composites were then treated at a temperature of about 550° C. for about 5 hours in the presence of substantially anhydrous hydrogen containing less than about 0.1 mol percent water. Catalyst samples were carefully obtained from the reaction zones and the finished catalysts were found to contain about 5.5% fluoride.

EXAMPLE II

This example illustrates the process of the present invention for the production of ethylbenzene utilizing the flow scheme as shown in the drawing. In this example, benzene and ethylene were fed to the alkylation reaction zone containing the conversion catalyst prepared in Example I. The effluent from the alkylation zone was commingled with effluent from the transalkylation zone and from the commingling step, unreacted benzene, desired ethylbenzene and higher molecular weight polyethylbenzenes were separated. A portion of the unreacted benzene was recycled to the alkylation zone, and the desired ethylbenzene was removed as product from the process. The polyethylbenzenes and a further portion of unreacted benzene were passed to the transalkylation reaction zone also containing the conversion catalyst prepared in Example I. The polyethylbenzenes were therein reacted with the benzene and the effluent therefrom was recycled to the commingling step as hereinabove mentioned.

The test was carried out with the pressure maintained at about 1000 p.s.i.g. in both reactors with a maximum temperature of 300° C. in the alkylation reaction zone and a maximum temperature of 320° C. in the transalkylation reaction zone. The benzene to ethylene mol ratio in the alkylation reactor was kept at about 8:1. The benzene to polyethylbenzene molar ratio was greater than 1 in the transalkylation zone.

In the test period illustrating the process of the present invention, ethylene conversion started out at 100% and continued at 100% throughout the entire test. During the test, transalkylation of the polyethylbenzenes to a substantially equilibrium mixture continued so that ultimate ethylbenzene yields based on benzene reacted approached the stoichiometric yields and continued at this high level. Simultaneously, as hereinabove mentioned, ethylene conversion of 100% was recorded, based on ethylene fed to the plant so that substantially no catalyst deactivation was observed in the alkylation reactor. At the completion of the run, the catalyst samples were taken and analyzed for carbon and fluorides and unusually low carbon levels were obtained. The fluoride content of the catalyst remained essentially unchanged.

EXAMPLE III

This example illustrates the alkylation of benzene with a synthetic refinery off-gas containing a minor quantity (about 10%) of ethylene. The same processing unit described in Example II was utilized for the experiment described in this example. A conversion catalyst similar to the one prepared in Example I was utilized in both reaction zones. Benzene and the refinery off-gas were fed to the alkylation reaction zone and the effluent from said zone was commingled with the effluent from the transalkylation zone and from the commingling step, unreacted benzene, desired ethylbenzene and higher molecular weight polyethylbenzenes were separated in the separation zone. A portion of the unreacted benzene was recycled to the alkylation zone and the desired ethylbenzene was removed as product from the process. The polyethylbenzenes and the remainder of the unreacted benzene were passed to the transalkylation zone also containing the conversion catalyst and the polyethylbenzenes were therein reacted with the benzene and the effluent therefrom recycled to the commingling step as hereinabove set forth.

The test was carried out at a pressure of about 900 p.s.i.g. for both reactors with a maximum temperature of about 235° C. in the alkylation reaction zone and a maximum temperature of about 245° C. in the transalkylation reaction zone. The benzene to olefin mol ratio in the alkylation reaction zone was kept at about 6:1. The benzene to polyethylbenzene mol ratio in the transalkylation reactor was maintained at about 12.0.

During the test period, ethylene conversion again started out at 100% and continued at 100% throughout the entire test. During the test, equilibrium transalkylation of the polyethylbenzenes continued so that over-all ethylbenzene yields based on benzene reacted approached the stoichiometric yields and continued at this high level. Ethylene conversion of 100% was recorded based on ethylene fed to the plant so that substantially no catalyst deactivation was again observed. At the completion of the run, catalyst samples were taken and analyzed for carbon and fluorides. Analyses of the fluoride level showed that substantially no fluoride was lost during the test period. Again, a very low carbon level was found to have been deposited on the catalyst in contradistinction to the normally obtained amount for this type of operation.

Similar results are also obtained when other oxygen-free inert gas-treated fluorine-containing refractory inorganic oxides characterized as having a Hammett acidity function value of less than −8.0, a representative number of which have been previously described, are utilized in the production of cumene by the alkylation of benzene with propylene and the transalkylation of polypropylbenzenes with benzene, and in the production of other alkyl-aromatic compounds as hereinbefore set forth utilizing the process of the present invention.

We claim as our invention:

1. A process for the production of an alkylaromatic compound which comprises alkylating an alkylatable aromatic compound with an olefin-acting compound in an alkylation reaction zone containing a conversion catalyst consisting essentially of a fluorine-containing refractory inorganic oxide composite characterized as having a Hammet acidity function value of less than −8.0 and containing from about 2 to 8% by weight of fluoride, said composite having been previously treated with a substantially anhydrous oxygen-free inert gas at a temperature of between 450° C. and about 700° C., commingling the effluent of said alkylation zone with effluent from a transalkylation reaction zone as hereinafter set forth, passing the thus commingled effluents to a separation zone, separating from the separation zone unreacted aromatic compound, desired monoalkylated aromatic compound and higher molecular weight polyalkylated aromatic compound, recycling at least a portion of said unreacted aromatic compound to the alkylation reaction zone, removing desired monoalkylated aromatic compound as product from the process, passing said polyalkylated aromatic compound and at least a portion of said unreacted aromatic compound to a transalkylation reaction zone containing said conversion catalyst, therein subjecting said polyalkylated aromatic compound to reaction with said unreacted aromatic compound in the presence of said conversion catalyst, and recycling the effluent from said transalkylation to said commingling step as aforesaid.

2. The process of claim 1 further characterized in that said alkylatable aromatic compound is an alkylatable aromatic hydrocarbon.

3. The process of claim 1 further characterized in that said olefin-acting compound is an olefinic hydrocarbon.

4. The process of claim 1 wherein the alkylatable aromatic compound in benzene and the olefin-acting compound is refinery off-gas containing a minor quantity of ethylene.

5. The process of claim 3 further characterized in that said fluorine-containing refractory inorganic oxide composite characterized as having a Hammet acidity function value of less than −8.0 is alumina.

6. The process of claim 3 further characterized in that said fluorine-containing refractory inorganic oxide composite characterized as having a Hammet acidity function value of less than −8.0 is silica-alumina.

7. A process for the production of monoalkylbenzene which comprises alkylating an alkylatable aromatic hydrocarbon with an olefin in an alkylation reaction zone containing a conversion catalyst consisting essentially of a fluorine-containing alumina composite characterized as having a Hammett acidity function value of less than −8.0 and containing from about 2 to 8% by weight of fluoride, said composite having been previously calcined in air at temperatures in excess of 400° C. followed by a treatment with substantially anhydrous oxygen-free inert gas at a temperature of between 450° C. and about 700° C., commingling the effluent of said alkylation zone with effluent from a transalkylation zone is hereinafter set forth, passing the thus commingled effluents to a separation zone, separating from the separation zone unreacted benzene, desired monoalkylbenzene and higher molecular weight polyalkylbenzenes, recycling at least a portion of said unreacted benzene to the alkylation reaction zone, removing desired monalkylbenzene as product from the process, passing said polyalkylbenzenes and at least a portion of said unreacted benzene to a transalkylation reaction zone containing said conversion catalyst, therein polyalkylbenzenes to react with said unreacted benzene in the presence of said conversion catalyst, and recycling the effluent from said transalkylation zone to said commingling step as aforesaid.

8. The process of claim 1 further characterized in that the alkylation reaction conditions are at a temperature of from about 210° C. to about 325° C., an alkylatable aromatic compound to olefin-acting compound ratio is in the range of from about 4:1 to about 20:1, a pressure of from about atmospheric to about 200 atmospheres, and a liquid hourly space velocity through the catalyst bed of from about 0.1 to about 10.

9. The process of claim 1 further characterized in that the transalkylation reaction conditions are at a temperature of from about 220° C. to about 350° C., an alkylatable aromatic compound to polyalkylated aromatic compound ratio of greater than 1, a pressure of from about atmospheric to about 200 atmospheres, and a liquid hourly space velocity through the catalyst bed of from about 0.1 to about 10.

10. The process of claim 1 further characterized in that said fluorine-containing refractory inorganic oxide composite characterized as having a Hammet acidity function value of less than −8.0 is subjected to high temperature calcination in an atmosphere of air at a temperature in excess of about 400° C. prior to said treating in the presence of a substantially anhydrous oxygen-free gas.

11. The process of claim 1 further characterized in that the alkylation and transalkylation zones are confined within separate reaction vessels.

12. The process of claim 1 further characterized in that the alkylation and transalkylation zones are confined within a single reaction vessel.

References Cited by the Examiner
UNITED STATES PATENTS

| | | | |
|---|---|---|---|
| 2,584,103 | 2/52 | Pines et al. | 260—671 |
| 2,756,261 | 7/56 | Fetterly | 260—672 |
| 2,995,611 | 8/61 | Linn et al. | 260—672 |

ALPHONSO D. SULLIVAN, *Primary Examiner.*